United States Patent [19]

Schlomm et al.

[11] Patent Number: 4,944,912
[45] Date of Patent: Jul. 31, 1990

[54] FUEL ROD FOR A NUCLEAR REACTOR FUEL ASSEMBLY

[75] Inventors: Hartmut Schlomm, Limeshain; Konrad Martin, Linsengericht, both of Fed. Rep. of Germany

[73] Assignee: Reaktor-Brennelement Union GmbH, Hanau, Fed. Rep. of Germany

[21] Appl. No.: 244,079

[22] Filed: Sep. 13, 1988

[30] Foreign Application Priority Data

Sep. 15, 1987 [DE] Fed. Rep. of Germany ....... 3730973

[51] Int. Cl.⁵ .............................................. G21C 3/00
[52] U.S. Cl. ..................................... 376/420; 376/412
[58] Field of Search ................................ 376/412, 420

[56] References Cited

U.S. PATENT DOCUMENTS 4,036,691  7/1977  Meadowcraft et al. ............ 376/412
4,814,138  3/1989  Fick ..................................... 376/463

FOREIGN PATENT DOCUMENTS 0076201  4/1983  European Pat. Off. .
3318138  11/1983  Fed. Rep. of Germany .
2229119  12/1974  France .

Primary Examiner—Donald P. Walsh
Attorney, Agent, or Firm—Herbert L. Lerner; Laurence A. Greenberg

[57] ABSTRACT

A fuel rod for a nuclear reactor fuel assembly includes a metal cladding tube having two closed ends. A column of nuclear fuel pellets is disposed in the cladding tube. A compression spring has helical coils and is coaxial with the column of pellets within one of the ends of the cladding tube. A shim has two sides and is disposed between the column of pellets and the helical spring. A pair of leaf springs on one of the sides of the shim is locked to and biased against the coils of the helical spring.

5 Claims, 2 Drawing Sheets

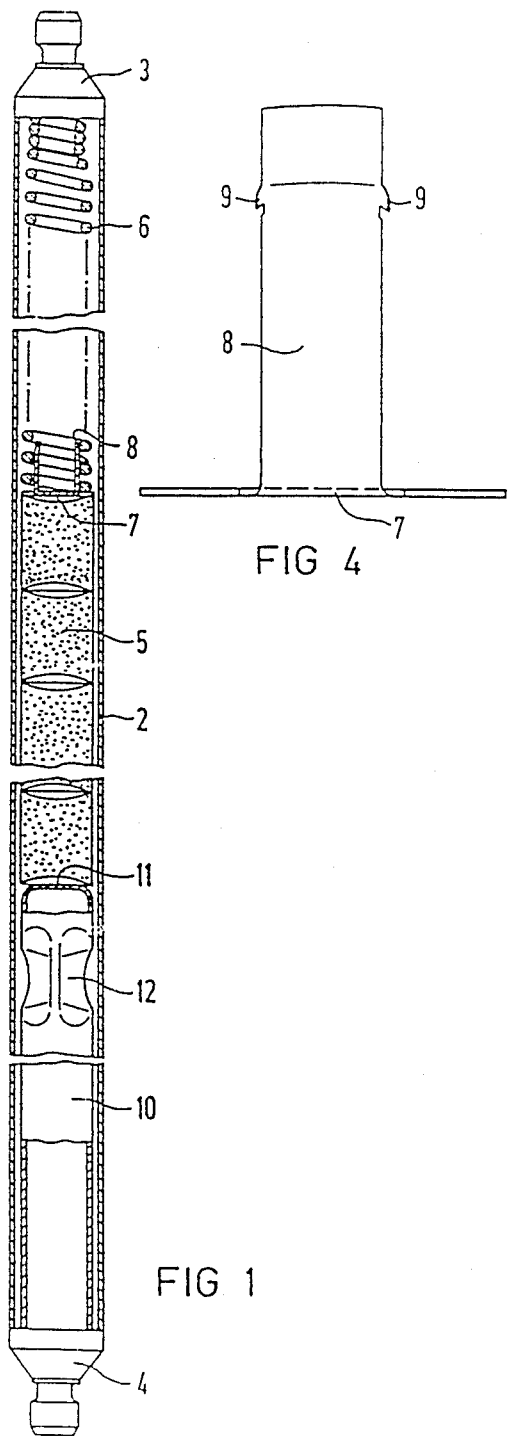
FIG 1
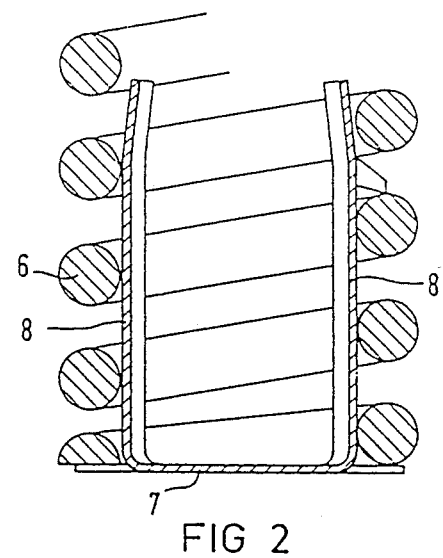
FIG 4
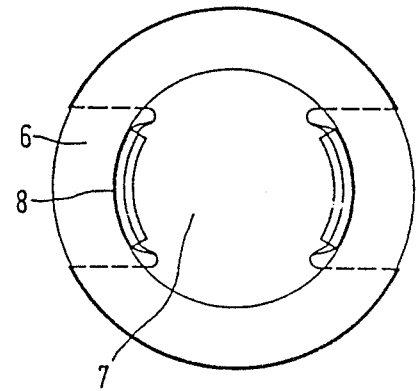
FIG 2
FIG 3

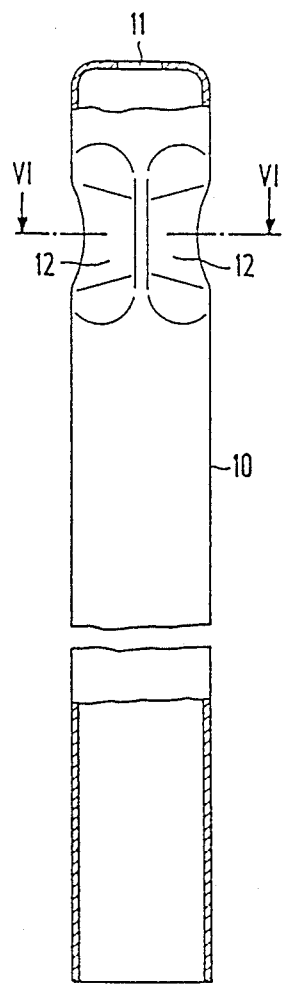
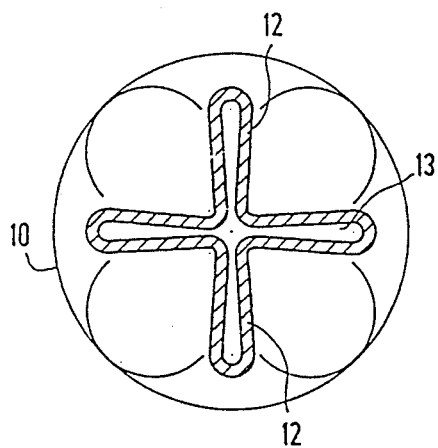
FIG 5
FIG 6

FUEL ROD FOR A NUCLEAR REACTOR FUEL ASSEMBLY

The invention relates to a fuel rod for a nuclear reactor fuel assembly having a metal cladding tube being closed on both ends, in which a column of nuclear fuel pellets is disposed and in which a compression spring in the form of a helical spring is disposed coaxially with the column at one end of the tube, and a shim or intermediate disc between the column and the helical spring.

A fuel rod of this kind is typical in the art. In this typical fuel rod, there may be a shim of aluminum oxide at one or both ends of the column of nuclear fuel pellets. The shim is intended to prevent small pieces of nuclear fuel, which break off from the ceramic nuclear fuel pellets during operation in a nuclear reactor, from reaching the empty space in the cladding tube at the particular end of the tube, where they could cause an undesirable change in the neutron flux and temperature distribution in the reactor core.

Aluminum oxide is not a nuclear fuel, and it is accordingly an object of the invention to provide a fuel rod for a nuclear reactor fuel assembly, which overcomes the hereinafore-mentioned disadvantages of the heretofore-known devices of this general type and which enables the space occupied by the aluminum oxide shim to be filled with nuclear fuel as well, for the sake of economical utilization of nuclear fuel in a nuclear reactor.

With the foregoing and other objects in view there is provided, in accordance with the invention, a fuel rod for a nuclear reactor fuel assembly, comprising a metal cladding tube having two closed ends, a column of nuclear fuel pellets disposed in the cladding tube, a compression spring having helical coils and being coaxial with the column of pellets within one of the ends of the cladding tube, a shim having two sides and being disposed between the column of pellets and the helical spring, and a pair of leaf springs on one of the sides of the shim being locked to and biased against the coils of the helical spring.

In accordance with another feature of the invention, the pair of leaf springs are force-lockingly connected to the coils of the helical spring.

Due to this construction, the shim need only be a relatively thin metal sheet, with a pair of leaf springs formed onto it, which occupies far less space than a shim of aluminum dioxide. The shim can also be attached to the helical spring, before this spring is introduced into the cladding tube during the manufacture of the fuel rod. Furthermore, whereas shims of aluminum oxide may be mistaken for nuclear fuel pellets during the manufacture of the fuel rod, this cannot happen with shims, which assures that only pellets of nuclear fuel will in fact be located at their intended sites in the column of pellets in the fuel rod cladding tube.

In accordance with a further feature of the invention, the pair of leaf springs has a fastening protrusion gripping one of the coils of the helical spring from behind. In this way, the shim can be reliably prevented from becoming detached from the compression spring upon insertion of the compression spring into the cladding tube.

In accordance with an added feature of the invention, the pair of leaf springs is disposed inside the helical spring. Due to this feature, it is very easy to prevent the shim from sticking to the inside of the cladding tube as the helical spring is being inserted into the cladding tube.

In accordance with a concomitant feature of the invention, there is provided a support tube disposed at the other of the ends of the cladding tube, the support tube having one open end resting on the column of pellets with an inwardly-oriented flanged rim, and the support tube having a jacket at the one end of the support tube being drawn inward forming a restricted inside cross section In this way, an empty space is created at the other end of the cladding tube, for receiving gaseous products of nuclear fission, during operation in a nuclear reactor. On the other hand, the restriction of the inside cross section of the support tube also assures that small particles of nuclear fuel broken off from the nuclear fuel pellets cannot reach the empty space located at the other end of the tube. Nevertheless, the gaseous products of nuclear fission can reach this empty space without hindrance.

Other features which are considered as characteristic for the invention are set forth in the appended claims.

Although the invention is illustrated and described herein as embodied in a fuel rod for a nuclear reactor fuel assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a fragmentary, diagrammatic, longitudinal-sectional view of a fuel rod according to the invention;

FIG. 2 is an enlarged longitudinal-sectional view of a shim or intermediate disc attached to a helical spring;

FIG. 3 is a plan view showing the end of the shim or intermediate disc of FIG. 2 that rests on a column of nuclear fuel pellets;

FIG. 4 is a side-elevational view of the shim or intermediate disc of FIGS. 2 and 3;

FIG. 5 is a partially sectional, side-elevational view of the end of the support tube in the fuel rod of FIG. 1, on which the column of nuclear fuel rests; and FIG. 6 is a cross-sectional view taken along the line VI—VI of FIG. 5, in the direction of the arrows.

Referring now to the figures of the drawings in detail and first, particularly, to FIG. 1 thereof, there is seen a fuel rod having a cladding tube 2 made of a zirconium alloy, which is closed each end with a respective end cap 3 or 4 that is also made of a zirconium alloy. The end caps 3 and 4 are welded in a gas-tight manner to the cladding tube 2.

A column of ceramic nuclear fuel pellets 5 is located in the cladding tube 2. Furthermore, a helical spring 6 is inserted at one end of the cladding tube 2 in such a way as to be coaxial with the column of nuclear fuel pellets 5 and thus coaxial with the cladding tube 2 as well. One end of the helical spring 6, which is a compression spring, is supported on the end cap 3, while a shim, support or intermediate disc 7 of sheet steel, which is thinner than each nuclear fuel pellet 5, is disposed on the other end of the helical spring, as best seen in FIG. 2. A pair of leaf springs 8 is formed onto one side of the alignment or fitting piece or shim 7. The leaf springs are substantially parallel to the longitudinal axis of the helical spring 6 and therefore of the cladding tube 2 and are also located inside the helical spring 6. Due to the outwardly-directed spreading force of the pair of leaf springs, they are in force-locking connection with the coils of the helical spring 6. A force-locking connection is one which connects two elements together by force, as opposed to a form-locking connection which is provided by the shapes of the elements themselves. As seen in FIG. 4, two fastening protrusions 9 are formed on the outside of one leaf spring of the pair of leaf springs 8, with which this leaf spring 8 grips one coil of the helical spring 6 from behind.

The other side of the shim 7 rests on the column of nuclear fuel pellets 5, where it touches a cover surface of the nuclear fuel pellet located on the end of the column.

A support tube 10 which is coaxial with the cladding tube 2 is located on the other end of the fuel rod and the cladding tube 2. The support tube is made of steel and rests with one end on the end cap 4. The other end of the support tube 10 has an inwardly-oriented flanged rim, which forms a central gas flow opening 11, as is best seen in FIG. 5. The column of nuclear fuel pellets 5 rests on the outside of this flanged rim. In other words, it rests on the cover surface of the nuclear fuel pellets on the end of the column.

The jacket of the support tube 10 is drawn inward at four points 12 at the end having the flanged rim forming the gas flow opening. The four points 12 are spaced apart from one another by an angle of 90° with respect to the longitudinal axis of the support tube 10. A restricted inside cross section 13 of the support tube 10 is therefore formed at this location.

The compression force of the helical spring 6 presses the column of nuclear pellets 5 against the support tube 10 and in turn presses the support tube 10 against the end cap 4. Gaseous nuclear fission products liberated during operation in a nuclear reactor can travel unhindered past the shim 7 into the interior of the cladding tube 2 occupied by the helical spring 6 and through the gas flow opening 11 and the cross-sectional restriction 13 at the support tube 10, in order to reach the empty space in the support tube 10. However, small particles of nuclear fuel that have broken off from the pellets 5 cannot travel past the shim 7 to reach the helical spring 6, nor can they enter the flow opening 11, and in particular the cross-sectional restriction 13, to enter the interior of the support tube 10.

The foregoing is a description corresponding in substance to German Application No. P 37 30 973.0, dated Sept. 15, 1987, the International priority of which is being claimed for the instant application, and which is hereby made part of this application. Any material discrepancies between the foregoing specification and the aforementioned corresponding German application are to be resolved in favor of the latter.

We claim:

1. Fuel rod for a nuclear reactor fuel assembly, comprising a metal cladding tube having two closed ends, a column of nuclear fuel pellets disposed in said cladding tube, a compression spring having helical coils and being coaxial with said column of pellets within one of said ends of said cladding tube, a shim having two sides and being disposed between said column of pellets and said helical spring, and a pair of leaf springs on one of said sides of said shim being locked to and biased against said coils of said helical spring.

2. Fuel rod according to claim 1, wherein said pair of leaf springs are force-lockingly connected to said coils of said helical spring.

3. Fuel rod according to claim 1, wherein said pair of leaf springs has a fastening protrusion gripping one of said coils of said helical spring from behind.

4. Fuel rod according to claim 1, wherein said pair of leaf springs is disposed inside said helical spring.

5. Fuel rod according to claim 1, including a support tube disposed at the other of said ends of said cladding tube, said support tube having one open end resting on said column of pellets with an inwardly-oriented flanged rim, and said support tube having a jacket at said one end of said support tube being drawn inward forming a restricted inside cross section.

* * * * *